(12) United States Patent
Hirose

(10) Patent No.: US 6,327,852 B1
(45) Date of Patent: Dec. 11, 2001

(54) EXHAUST GAS EMISSION CONTROL APPARATUS OF HYBRID VEHICLE

(75) Inventor: Katsuhiko Hirose, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/525,246

(22) Filed: Mar. 15, 2000

(30) Foreign Application Priority Data

Mar. 19, 1999 (JP) .................................................. 11-075920

(51) Int. Cl.⁷ ...................................................... F01N 3/00
(52) U.S. Cl. ................................ 60/297; 60/284; 180/65.4
(58) Field of Search ............................ 60/284, 295, 297; 180/65.2, 65.4, 309

(56) References Cited

U.S. PATENT DOCUMENTS

| | | | |
|---|---|---|---|
| 5,158,753 | * | 10/1992 | Take et al. ........................ 55/DIG. 30 |
| 5,492,190 | * | 2/1996 | Yoshida ................................ 180/65.4 |
| 5,497,619 | * | 3/1996 | Yamada et al. ......................... 60/297 |
| 5,701,736 | * | 12/1997 | Morishima et al. .................... 60/297 |
| 5,766,559 | * | 6/1998 | Blanchet et al. ........................ 60/297 |
| 5,804,148 | * | 9/1998 | Kanesaka et al. ...................... 60/297 |
| 5,873,242 | * | 2/1999 | Morishima et al. .................... 60/297 |
| 5,887,422 | * | 3/1999 | Abe et al. ............................... 60/297 |

FOREIGN PATENT DOCUMENTS

HEI 4-194309   7/1992   (JP) .
HEI 10-61426   3/1998   (JP) .

* cited by examiner

*Primary Examiner*—Thomas Denion
*Assistant Examiner*—Diem Tran
(74) *Attorney, Agent, or Firm*—Kenyon & Kenyon

(57) ABSTRACT

An exhaust gas emission control apparatus is provided in an exhaust passage of a hybrid mechanism driven by an internal combustion engine and an electric motor. The apparatus has an adsorbent that adsorbs unburned fuel contained in exhaust gas when the temperature of the adsorbent is lower than a predetermined temperature, and that releases adsorbed unburned fuel therefrom when the temperature is at least the predetermined temperature. When the temperature of the adsorbent is lower than the predetermined temperature, the apparatus controls the hybrid mechanism to delay an increase in the temperature of the adsorbent.

8 Claims, 7 Drawing Sheets

EXHAUST GAS EMISSION CONTROL APPARATUS OF HYBRID VEHICLE

The disclosure of Japanese Patent Application No. HEI 10-75920 filed on Mar. 19, 1999 including the specification, drawings and abstract is incorporated herein by reference in its entirety.

BACKGROUND OF THE INVENTION

1. Field of the Invention

The present invention relates to an exhaust gas emission technology for a hybrid vehicle driven by an internal combustion engine and an auxiliary power source.

2. Description of the Related Art

Recently, there has been a demand for a reduction in fuel consumption of and emissions from internal combustion engines installed in motor vehicles. As a consequence, hybrid vehicles having two drive power sources, e.g., an internal combustion engine and an electric motor, have been pursued.

Known hybrid vehicles have incorporated an internal combustion engine, an electric power generator that is operated by drive power from the engine, a battery for storing electric power generated by the generator, an electric motor operated by electric power generated by the generator and/or electric power stored in the battery, wheels connected mechanically to a rotating shaft of the electric motor, and a drive power split mechanism that distributes drive power from the engine to the generator and to the rotating shaft of the electric motor.

When a load applied to this vehicle is within a low load range, for example, when the vehicle begins to move or during low-speed running, the engine is stopped and electric power from the battery is applied to the electric motor. Upon receiving electric power from the battery, the electric motor turns its rotating shaft. Therefore, the rotating shaft of the electric motor is turned by drive power generated by the electric motor, and the torque of the rotating shaft is transmitted to the wheels. Thus, in this case the hybrid vehicle runs only on the electric power from the battery.

When the vehicle load is within an intermediate range, e.g., during normal driving, the engine operates and the drive power split mechanism distributes drive power from the engine to the generator and the electric motor. Using the drive power distributed from the drive power split mechanism, the generator generates electric power. Power generated by the generator is applied to the electric motor which then turns its rotating shaft. In this case, the rotating shaft of the electric motor is turned by a combined drive power including power generated by the electric motor and power distributed from the drive power split mechanism. The torque from the rotating shaft is transmitted to the wheels. Thus in this case, the hybrid vehicle runs on power generated by the engine and on electric power generated using power from the engine.

When the vehicle load is within a high load range, e.g., during acceleration or the like, the engine is operated and the drive power split mechanism distributes power from the engine to both the generator and the rotating shaft of the electric motor. The power transmitted to the generator from the engine via the power split device operates the generator to generate. The electric power generated by the generator is combined with electric power from the battery and this combined power is applied to the electric motor to drive the rotating shaft of the motor. Therefore, the rotating shaft of the electric motor is turned by power generated by the electric motor combined with drive power distributed from the drive power split mechanism. Torque from the rotating shaft is transmitted to the wheels. Therefore, the hybrid vehicle runs on drive power generated by the engine, electric power generated using drive power from the engine, and electric power from the battery.

When the hybrid vehicle is in a decelerating or braking state, regenerative electric power generation is performed using torque transmitted from the wheels to the rotating shaft of the electric motor. That is, as the wheels and the rotating shaft of the electric motor are mechanically connected, torque is transmitted from the wheels to the rotating shaft of the electric motor during deceleration or braking of the vehicle operating the electric motor as a power generator. Thus, it is possible to perform generally termed regenerative electric power generation, that is, conversion of the kinetic energy transmitted from the wheels to the rotating shaft of the electric motor into electric energy. Electric power regeneratively generated by the electric motor is stored in the battery.

In the hybrid vehicle, when the battery must be charged or the engine needs to be warmed-up, the engine is started and drive power is transmitted from the engine to the generator via the drive power split mechanism to generate electric power.

Thus, the engine of the above-described hybrid vehicle operates efficiently and reduces fuel consumption.

With regard to vehicle-installed internal combustion engines, there are also demands to reduce harmful gas components present in exhaust gas, such as hydrocarbons (HC), carbon monoxide (CO), nitrogen oxide ($NO_x$), and the like.

To respond to such demands, exhaust gas emission catalysts, such as three-way catalysts, oxidation catalysts, $NO_x$-absorbing/reducing catalysts, selective $NO_x$-reducing catalysts and the like, have been arranged in exhaust passages to treat or lessen harmful gas components contained in the exhaust gas.

Exhaust gas emission catalysts, as listed above, have predetermined activation temperatures (e.g., 300–500° C.) above which they are able to lessen harmful gas components present in exhaust gas. That is, when the temperature of such a catalyst is below its activation temperature (e.g, at the time of cold start of the engine, or the like), it is difficult to sufficiently lessen harmful gas components present in exhaust gas.

At the time of a cold start of the engine, in particular, an increased amount of unburned fuel (e.g., HC) is present in the exhaust gas because an amount of fuel injected to the engine is increased above a normal level to improve the startability of the engine, to promote the warming-up of the engine, etc. However at this time, combustion in the engine becomes unstable. If the exhaust gas emission catalysts are not activated in this situation, relatively large amounts of unburned fuel are left untreated and are emitted into the atmosphere.

As a solution to the above-described problem, an engine exhaust gas removing apparatus is described in Japanese Patent Application Laid-Open No. HEI 4-194309. The exhaust gas removing apparatus includes a catalytic converter provided in an exhaust passage of an engine, a bypass passage connected to the exhaust passage which bypasses the catalytic converter, a filter chamber in the bypass passage for adsorbing unburned fuel components contained in exhaust gas below a predetermined temperature and for releasing adsorbed unburned fuel s when tho temperature is at least the predetermined temperature, a recovery passage connecting a portion of the bypass passage downstream of the filter chamber to a portion of the exhaust passage located near an inlet of the catalytic converter, a first open-close valve in a portion of the exhaust passage upstream of the connection to the recovery passage, a second open-close valve in the recovery passage, a third open-close valve in a portion of the bypass passage downstream of the connection to the recovery passage, and a flow regulator valve in a portion of the bypass passage upstream of the filter chamber.

When the catalytic converter of this system is not activated, the first open-close valve opens the exhaust passage, the second open-close valve closes the recovery passage, the third open-close valve opens the bypass passage, and the flow regulator valve is fully opened.

In this situation, all exhaust gas from the engine bypasses the catalytic converter and flows into the atmosphere via the bypass passage. When exhaust gas passes through the filter chamber provided in the bypass passage, unburned fuel contained in exhaust gas is adsorbed into activated carbon provided therein.

When the catalytic converter is activated, the first open-close valve opens the exhaust passage, the second open-close valve opens the recovery passage, the third open-close valve closes the bypass passage, and the flow regulator valve is driven to a predetermined opening. Most of the exhaust gas flows into the atmosphere via the catalytic converter, and the remainder flows into the bypass passage. The amount of exhaust gas introduced into the bypass passage flows into the atmosphere via the filter chamber, the recovery passage and the catalytic converter. Heat from exhaust gas passing through the filter chamber increases the temperature in the filter chamber to at least the predetermined temperature, so that unburned fuel adsorbed in the filter chamber is released and is led together with exhaust gas into the catalytic converter, wherein the unburned fuel is treated and lessened in amount.

If the load on the engine increases while unburned fuel contained in exhaust gas is being adsorbed in the filter chamber, that is, while the entire amount of exhaust gas from the engine is passing through the filter chamber, the exhaust gas temperature rises and the flow of exhaust gas increases, so that the amount of heat transferred from exhaust gas to the filter chamber increases. As a result, the temperature in the filter chamber rapidly rises, so that unburned fuel adsorbed in the filter chamber starts to desorb.

If the engine load increases immediately after the engine is started, the temperature in the filter chamber may rises to or above the predetermined temperature before a significant amount of unburned fuel has been adsorbed in the filter chamber. In that case, therefore, the adsorbing capability of the filter chamber is not fully utilized.

Furthermore, if the filter chamber temperature rapidly increases due to an increase in the engine load, the filter chamber temperature reaches the predetermined temperature before activation of the catalytic converter, so that unburned fuel released from the filter chamber may be let out into the atmosphere without being sufficiently treated.

SUMMARY OF THE INVENTION

Accordingly, it is an object of the invention to improve the quality of emission from a hybrid vehicle incorporating an internal combustion engine and an electric motor by providing a system that enables more efficient utilization of the capability of an adsorbent provided in an exhaust passage of the engine.

To achieve the aforementioned and other objects, an exhaust gas emission control apparatus for a hybrid vehicle that drives the vehicle using power from an engine and an electric motor, includes an adsorbent provided in an exhaust passage of the engine, the adsorbent adsorbing unburned fuel contained in exhaust gas when a temperature of the adsorbent is lower than a predetermined temperature, and releasing the unburned fuel therefrom when the temperature of the adsorbent is equal to or higher than the predetermined temperature, and a controller that delays an increase in the temperature of the adsorbent when the temperature of the adsorbent is lower than the predetermined temperature.

In the above-described exhaust gas emission control apparatus, the time consumed before the temperature of the adsorbent rises to or above the predetermined temperature is increased, to increase an amount of time allowed for the adsorbent to adsorb unburned fuel contained in exhaust gas. Therefore, an increased amount of unburned fuel is adsorbed in the adsorbent and the adsorbing capability of the adsorbent is fully utilized.

The adsorbent is heated mainly by heat transferred from exhaust gas. Therefore, it is possible to delay an increase of the temperature of the adsorbent by decreasing the temperature of exhaust gas flowing through the adsorbent and by decreasing a rate of flow of exhaust gas through the adsorbent. To decrease the exhaust gas temperature and the exhaust gas flow, the load on the engine may be decreased by decreasing the drive power output from the engine. A mere decrease of the drive power outputted from the engine may result in insufficient vehicle driving force and may consequently result in a deterioration of drivability. Therefore, it is preferable that the power output from the electric motor be increased simultaneously with a decrease in the power from the engine to secure a desired vehicle driving force.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the hybrid vehicle exhaust gas emission control apparatus of the invention will be described in detail hereinafter with reference to the accompanying drawings.

Figure 1:
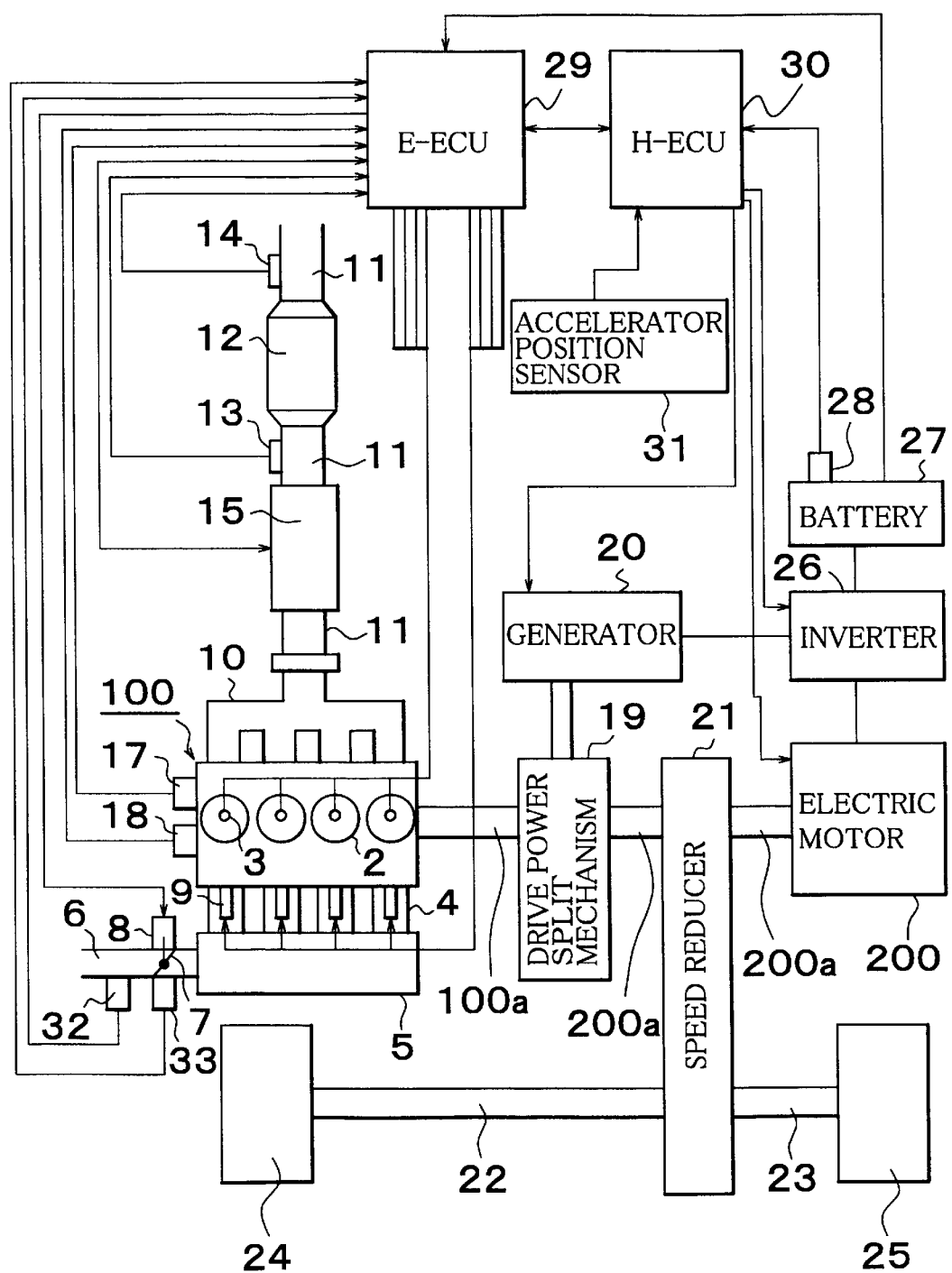
FIG. 1 is a schematic illustration of a hybrid mechanism of a hybrid vehicle to which the invention is applied.

FIG. 1 is a schematic illustration of a hybrid mechanism of a hybrid vehicle to which the exhaust gas emission control apparatus of the invention is applied. The hybrid mechanism incorporates two drive power sources, that is, an internal combustion engine 100 and an electric motor 200.

The engine 100 is a four-cylinder four-stroke gasoline engine. In the engine 100, each cylinder 2 is provided with an ignition plug 3 in such a manner that the ignition plug 3 faces a combustion chamber (not shown) of the cylinder. The engine 100 is equipped with a crank position sensor 17 that outputs a pulse signal every time a crankshaft 100a of the engine 100, that is, an engine output shaft, rotates a predetermined angle (e.g., 30°), and a water temperature sensor 18 that outputs an electric signal corresponding to the temperature of cooling water that flows in a water jacket formed in the engine 100.

An intake manifold 4 is connected to the engine 100. Each branch pipe of the intake manifold 4 is connected in communication to the combustion chamber of the corresponding cylinder 2 via an intake port (not shown). Each branch pipe of the intake manifold 4 is provided with a fuel injection valve 9 in such a manner that the jet opening of the fuel injection valve 9 faces the corresponding intake port.

The intake manifold 4 is connected to a surge tank 5. The surge tank 5 is connected to an intake pipe 6. Provided in partway of the intake pipe 6 is a throttle valve 7 for adjusting the flow of intake air through the intake pipe 6.

The throttle valve 7 is provided with an actuator 8 that is formed by a step motor or the like so as to open and close the throttle valve 7 in accordance with the magnitude of current applied thereto, and a throttle position sensor 33 that outputs an electric signal corresponding to the opening extent of the throttle valve 7.

An air flow meter 32 that outputs an electric signal corresponding to the mass of fresh air flowing through the intake pipe 6 is provided in a portion of the intake pipe 6 that extends upstream of the throttle valve 7.

An exhaust manifold 10 is connected to the engine 100. Each branch pipe of the exhaust manifold 10 is connected in communication to a combustion chamber of the corresponding cylinder 2 via an exhaust port (not shown). The exhaust manifold 10 is connected to an exhaust pipe 11. The exhaust pipe 11 is connected at its downstream end to a muffler (not shown).

A three-way catalyst device 12 is provided in partway of the exhaust pipe 11. The three-way catalyst device 12 is formed by a ceramic support that is formed from cordierite into a grating shape so as to have a plurality of through-holes that extend in the flowing direction of exhaust gas, and a catalyst layer coated on surfaces of the ceramic support.

The catalyst layer of the three-way catalyst device 12 is formed by, for example, loading surfaces of porous alumina ($Al_2O_3$) having many pores with a precious metal catalyst substance of a platinum-rhodium (Pt—Rh) family.

The thus-constructed three-way catalyst device 12 activates at or above a predetermined temperature (e.g., 300° C.). If the air-fuel ratio of exhaust gas flowing into the three-way catalyst device 12 is within a predetermined range (catalytic emission window) near the theoretical air-fuel ratio when the three-way catalyst device 12 is active, the three-way catalyst device 12 causes hydrocarbons (HC) and carbon monoxide (CO) contained in exhaust gas to react with oxygen ($O_2$) contained in exhaust gas, that is, to oxidize into water ($H_2O$) and carbon dioxide ($CO_2$) and, at the same time, causes nitrogen oxide ($NO_x$) contained in exhaust gas to react with hydrocarbons (HC) and carbon monoxide (CO) contained in exhaust gas, that is, to reduce into water ($H_2O$), carbon dioxide ($CO_2$) and nitrogen ($N_2$)

If the engine 100 is a lean-burn engine, or an in-cylinder injection type engine, or a diesel engine, the three-way catalyst device 12 may be replaced by a $NO_x$-absorbing/reducing catalyst, a selective $NO_x$-reducing catalyst, or the like.

A portion of the exhaust pipe 11 upstream of the three-way catalyst device 12 is provided with an upstream-side air-fuel ratio sensor 13 that outputs an electric signal corresponding to the air-fuel ratio of exhaust gas flowing into the three-way catalyst device 12. A portion of the exhaust pipe 11 downstream of the three-way catalyst device 12 is provided with a downstream-side air-fuel ratio sensor 14 that outputs an electric signal corresponding to the air-fuel ratio of exhaust gas let out of the three-way catalyst device 12.

The upstream-side air-fuel ratio sensor 13 and the downstream-side air-fuel ratio sensor 14 are substantially made up of, for example, a solid electrolyte portion formed from zirconia (ZrO2) into a tubular shape by firing, an outside platinum electrode covering an outside face of the solid electrolyte portion, and an inside platinum electrode covering an inside face of the solid electrolyte portion. Each of the air-fuel ratio sensors 13, 14 outputs current proportional to the oxygen concentration in exhaust gas (the concentration of unburned fuel if the air-fuel ratio is in a rich side of the theoretical air-fuel ratio) as oxygen ions migrate upon application of voltage between the electrodes.

Figure 2:
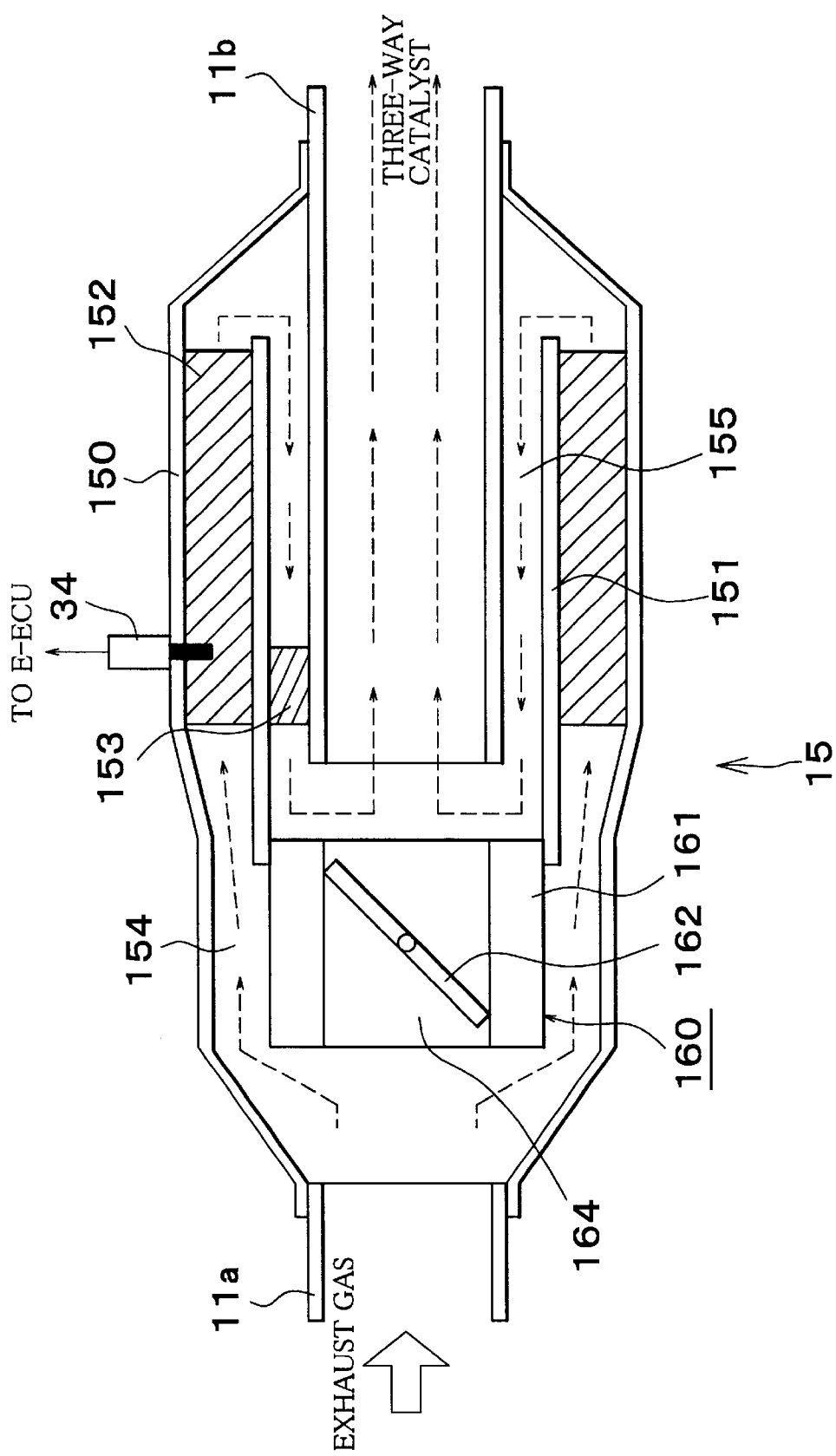
FIG. 2 is an illustration of an internal construction of an adsorber mechanism.

A portion of the exhaust pipe 11 upstream of the upstream-side air-fuel ratio sensor 13 is provided with an adsorber mechanism 15. As shown in FIG. 2, the adsorber mechanism 15 includes an outer tube 150 having an inside diameter that is larger than an outside diameter of the exhaust pipe 11, an inner tube 151 having an inside diameter larger than the outside diameter of the exhaust pipe 11 and having an outside diameter smaller than the inside diameter of the outer tube 150, and an annular adsorbent 152 disposed between the inner tube 151 and the outer tube 150.

Within the outer tube 150 of the adsorber mechanism 15, the exhaust pipe 11 is separated into an upstream-side exhaust pipe 11a and a downstream-side exhaust pipe 11b. The upstream-side exhaust pipe 11a and the downstream-side exhaust pipe 11b are connected by the outer tube 150.

The downstream-side exhaust pipe 11b is supported by the outer tube 150 in such a manner that an upstream open end portion of the downstream-side exhaust pipe 11b is protruded into the outer tube 150 and a distal end of the protruded open end portion is a free end. Correspondingly, the inner tube 151 is supported within the outer tube 150 in such a manner that an upstream-side open end portion of the inner tube 151 is fixed to the outer tube 150 or the exhaust pipe 11 or a valve device 160 described later, and that a downstream open end portion of the inner tube 151 is not fixed to any one of the outer tube 150, the exhaust pipe 11 and the valve device 160, and that an upstream-side end portion of the inner tube 151 is protruded to the upstream side of the upstream-side end of the downstream-side exhaust pipe 11b.

This construction substantially prevents durability deterioration of the adsorber mechanism 15. The temperature of the outer tube 150 is likely to be lower than that of the inner tube 151 or the downstream-side exhaust pipe 11b. Therefore, if the outer tube 150 were connected directly or via the valve device 160 to both ends of the inner tube 151 or an upstream-side end portion of the downstream-side exhaust pipe 11b in addition to the outer tube 150 being fixed to the upstream-side exhaust pipe 11a and to the downstream-side exhaust pipe 11*b*, the adsorber mechanism 15 could break due to thermal expansion differences among the outer tube 150, the inner tube 151 and the downstream-side exhaust pipe 11*b*.

The adsorbent 152 is fixed to only one of the outer tube 150 and the inner tube 151 so as to allow thermal expansion differences between the outer tube 150 and the inner tube 151 due to temperature differences therebetween.

The adsorbent 152 is formed by, for example, a material mainly containing zeolite. The adsorbent 152 adsorbs unburned fuel from exhaust gas below a predetermined temperature, and releases adsorbed unburned fuel when the temperature of the adsorbent 152 rises to or above the predetermined temperature. The adsorbent 152 is provided with an adsorbent temperature sensor 34 that outputs an electric signal corresponding to the temperature of the adsorbent 152.

Retainer members 153 are disposed at a plurality of sites in a space portion 155 formed between the inner tube 151 and the downstream-side exhaust pipe 11*b*, in order to enhance the vibration resistance of the downstream-side exhaust pipe 11*b*.

Each retainer member 153 is fixed to only one of an inner wall surface of the inner tube 151 and an outer wall surface of the downstream-side exhaust pipe 11*b*. Thus, the inner tube 151 and the downstream-side exhaust pipe 11*b* are left unfixed to each other, thereby making it possible to absorb thermal expansion differences between the downstream-side exhaust pipe 11*b* and the inner tube 151 in the direction of an axis thereof.

Figure 3:
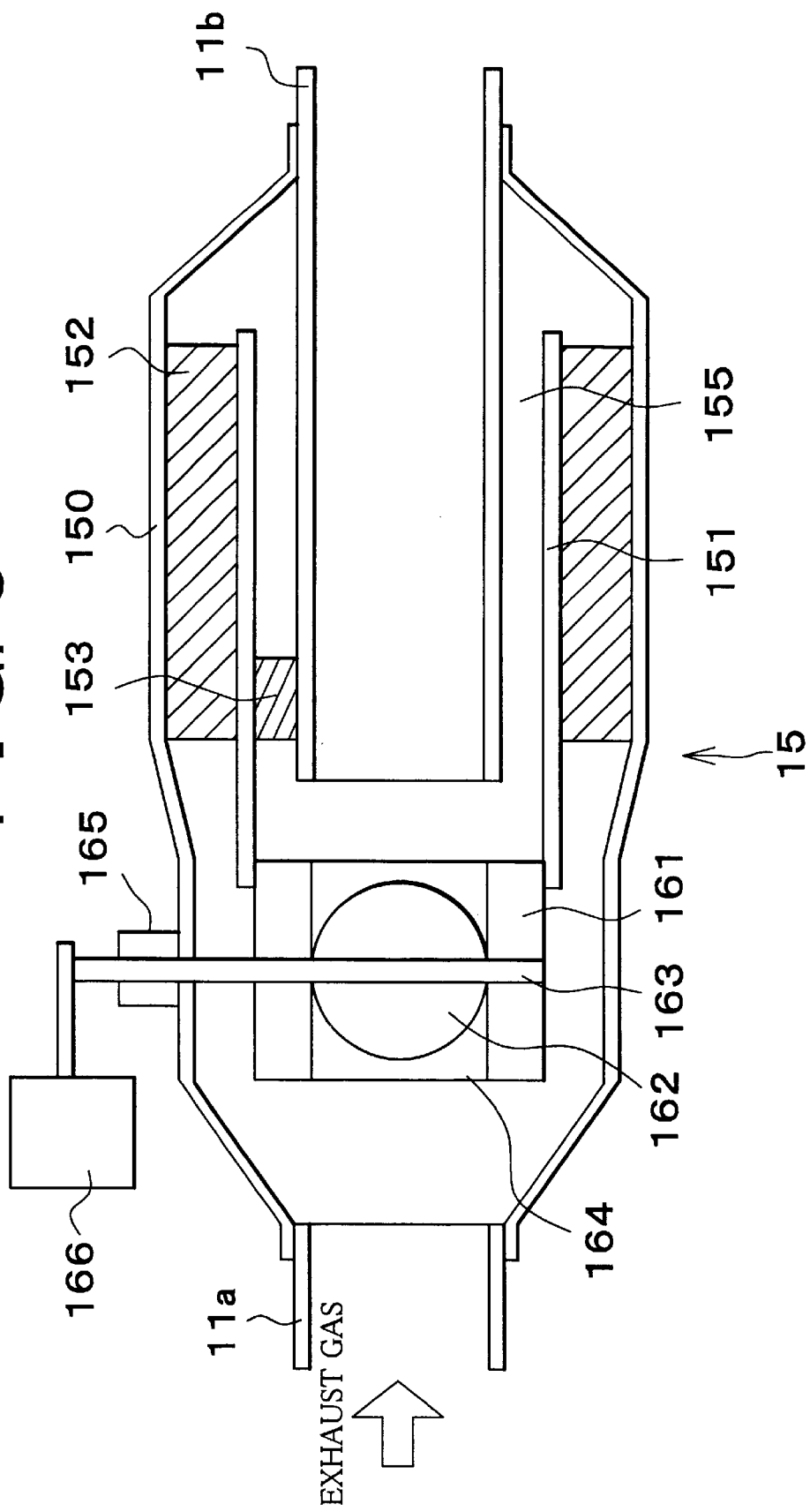
FIG. 3 is another illustration of the internal construction of the adsorber mechanism.

The valve device 160 is provided at the upstream-side open end of the inner tube 151 for opening and closing the upstream-side open end of the inner tube 151. The valve device 160 serves as an exhaust valve, and has a butterfly type two-way valve as shown in FIG. 3.

More specifically, the valve device 160 includes a housing 161 fitted to the upstream-side open end of the inner tube 151, a passageway 164 extending through the housing 161 in the direction of the axis thereof, a valve body 162 that opens and closes the passageway 164, and a shaft 163 connected to the valve body 162.

The shaft 163 is rotatably supported at an end portion thereof by the housing 161 of the valve device 160. At the other end, the shaft 163 is rotatably supported by a bearing 165 that is provided on an outer wall surface of the outer tube 150. The other end of the shaft 163 is connected to an actuator 166 via a link mechanism or the like. The actuator 166 is formed by a step motor or the like so as to be able to drive and open and close the shaft 163 and the valve body 162 in accordance with the magnitude of current applied thereto.

In the thus-constructed adsorber mechanism 15, the actuator 166 is controlled so that the valve body 162 of the valve device 160 is completely closed as shown in FIG. 2, when the three-way catalyst device 12 is in the non-active state.

In this situation, an exhaust passage (main exhaust passage) extending from the upstream-side exhaust pipe 11*a* to the downstream-side exhaust pipe 11*b* via the passageway 164 of the valve device 160 is in a non-conducting state, so that the entire amount of exhaust gas introduced from the upstream-side exhaust pipe 11*a* into the adsorber mechanism 15 is guided by an annular space 154 defined between the inner tube 151 and the outer tube 150 so as to pass through the adsorbent 152.

After passing through the adsorbent 152, exhaust gas strikes an inner wall surface of the outer tube 150 and changes its flowing direction to enter an annular space 155 that is defined between the inner tube 151 and the downstream-side exhaust pipe 11*b*.

After being led into the annular space 155, exhaust gas flows through the annular space 155 from the downstream side toward the upstream side of the adsorber mechanism 15. After flowing through the annular space 155, exhaust gas strikes the valve device 160 and changes its flowing direction to enter the downstream-side exhaust pipe 11*b*. Hereinafter, the exhaust passage extending from the upstream-side exhaust pipe 11*a* to the downstream-side exhaust pipe 11*b* via the annular space 154 and the annular space 155 will be referred to as "bypass passage".

Figure 4:
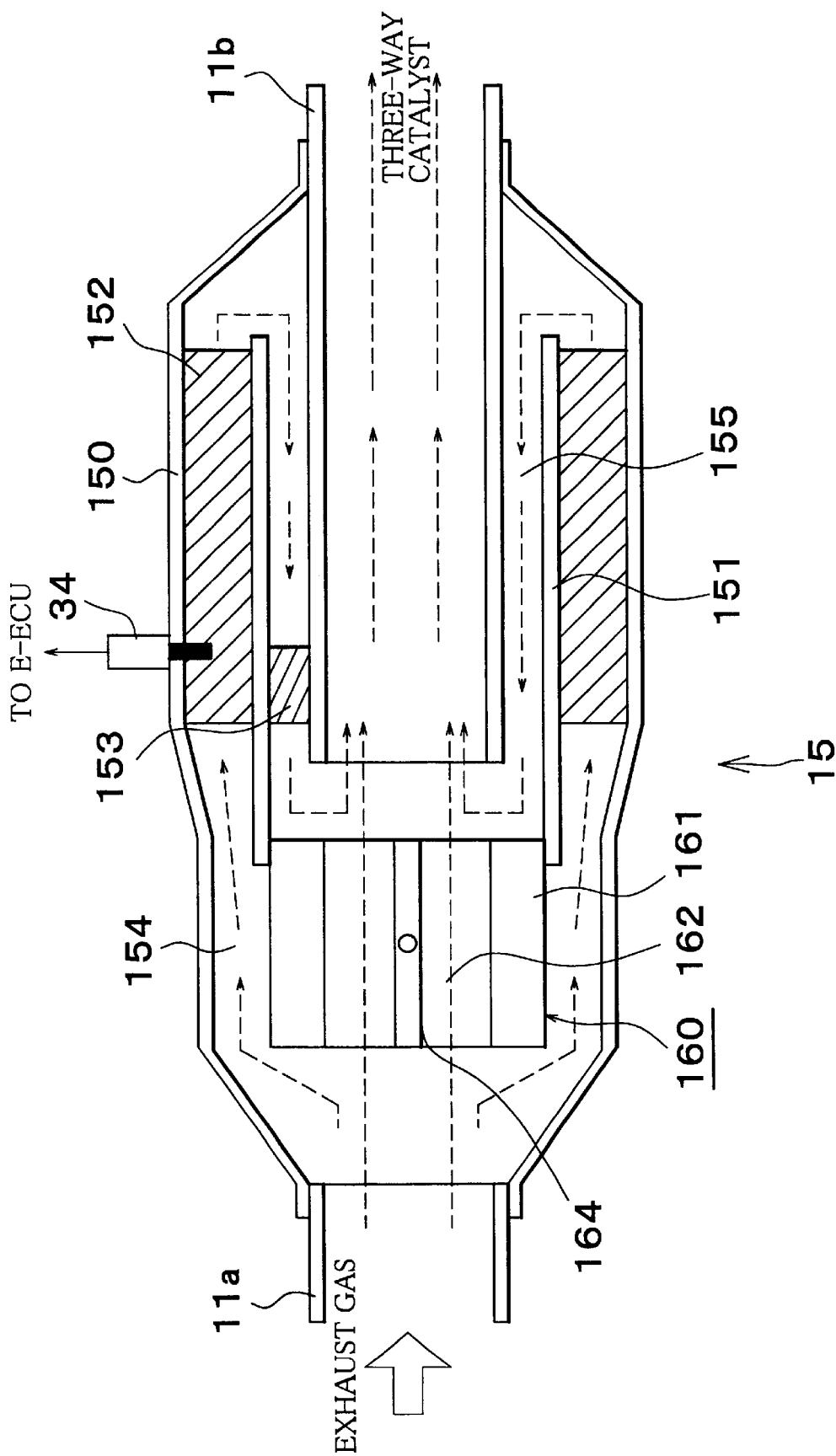
FIG. 4 is an illustration of operation of the adsorber mechanism.

After the three-way catalyst device 12 activates, the actuator 166 is controlled so that the valve body 162 of the valve device 160 becomes fully open as shown in FIG. 4.

In this situation, the main exhaust passage extending in the adsorber mechanism 15 from the upstream-side exhaust pipe 11*a* to the downstream-side exhaust pipe 11*b* via the passageway 164 of the valve device 160 and the bypass passage extending from the upstream-side exhaust pipe 11*a* to the downstream-side exhaust pipe 11*b* via the annular space 154 and the annular space 155 are both in a conducting state.

The adsorber mechanism 15 is designed so that the exhaust gas drag in the bypass passage is greater than the exhaust gas drag in the main exhaust passage. Therefore, most of the exhaust gas introduced from the upstream-side exhaust pipe 11*a* into the adsorber mechanism 15 flows through the main exhaust passage, and the remainder flows through the bypass passage.

Referring back to FIG. 1, the crankshaft 100*a* of the engine 100 is connected to a drive power split mechanism 19. The drive power split mechanism 19 is mechanically connected to an electric power generator 20 and a rotating shaft (motor shaft) 200*a* of an electric motor 200.

The drive power split mechanism 19 is formed by, for example, a planetary gear set that includes a planetary carrier supporting pinion gears, a ring gear disposed outwardly of the planetary carrier, and a sun gear disposed inwardly of the planetary carrier. A rotating shaft of the planetary carrier is connected to the engine output shaft 100*a*. A rotating shaft of the ring gear is connected to the motor shaft 200*a*. A rotating shaft of the sun gear is connected to the electric power generator 20.

The motor shaft 200*a* of the motor shaft 200*a* is connected to a speed reducer 21. The speed reducer 21 is connected to drive wheels 24, 25 via drive shafts 22, 23. The speed reducer 21 is formed by combining a plurality of gears. The speed reducer 21 reduces the rotation speed of the motor shaft 200*a* and transmits rotation to the drive shafts 22, 23.

The electric power generator 20 is electrically connected to an inverter 26. The inverter 26 is electrically connected to a battery 27 and the electric motor 200.

The generator 20 is formed by an AC synchronous electric motor. When exciting current is applied to the electric power generator 20, the electric power generator 20 generates electric power by converting kinetic energy that is inputted thereto from the engine 100 via the drive power split mechanism 19 into electric energy. Furthermore, the generator 20 serves as a starter motor for the engine 100 when drive power is applied from the battery 27 to the generator 20 at the time of start of the engine 100.

The battery 27 is formed by connecting a plurality of nickel metal hydride batteries in series. The battery 27 is provided with an SOC (state of charge) controller 28 that calculates a state of charge of the battery 27 based on an accumulated value of the amount of current discharged from the battery 27 and an accumulated value of the amount of current charged into the battery 27.

The electric motor 200 is formed by an AC synchronous electric motor. When electric power generated by the generator 20 and/or electric power form the battery 27 is applied to the electric motor 200, the electric motor 200 rotates the motor shaft 200a by torque in accordance with the magnitude of the applied electric power. During deceleration of the vehicle, the electric motor 200 serves as a power generator to perform generally termed regenerative power generation, that is, conversion of kinetic energy transmitted from the wheels 24, 25 to the motor shaft 200a via the drive shafts 22, 23 and the speed reducer 21 into electric energy.

The inverter 26 is an electric power converter formed by combining a plurality of transistors. The inverter 26 selectively changes among application of electric power generated by the generator 20 to the battery 27, application of electric power generated by the generator 20 to the electric motor 200, electric power stored in the battery 27 to the electric motor 200, and application of electric power regeneratively generated by the electric motor 200 to the battery 27.

The generator 20 and the electric motor 200 are formed by AC synchronous electric motors as mentioned above. Therefore, when applying electric power generated by the generator 20 to the battery 27, the inverter 26 converts AC voltage to DC voltage before the power application to the battery 27. Similarly, when applying electric power from the battery 27 to the electric motor 200, the inverter 26 converts DC voltage to AC voltage before the power application to the electric motor 200. When applying electric power regeneratively generated by the electric motor 200 to the battery 27, the inverter 26 converts AC voltage to DC voltage before the power application to the battery 27.

The hybrid mechanism has an electronic control unit (E-ECU) 29 for controlling the engine 100 and an electronic control unit (H-ECU) 30 for overall control of the entire hybrid mechanism.

The H-ECU 30 is connected to the SOC controller 28 and to an accelerator position sensor 31 that outputs an electric signal corresponding to the amount of operation of an accelerator pedal (not shown), by electric wirings. The H-ECU 30 accepts input of the output signal (accelerator pedal depression degree signal) of the accelerator position sensor 31 and input of the output signal (signal indicating the state of charge of the battery 27) of the SOC controller 28.

The H-ECU 30 is connected to the generator 20, the inverter 26 and the electric motor 200 by electric wirings. The H-ECU 30 is also connected to the E-ECU 29 by a bidirectional communication line. Based on the signals from the accelerator position sensor 31, the SOC controller 28 and the like, the H-ECU 30 controls the generator 20, the inverter 26 and the electric motor 200. The H-ECU 30 is also able to control the engine 100 through the E-ECU 29.

When an ignition switch is switched from an off-state to an on-state, the H-ECU 30 starts the engine 100; more specifically, the H-ECU 30 controls the inverter 26 to apply a drive electric power from the battery 27 to the generator 20 so that the generator 20 operates as a starter motor, and also controls the E-ECU 29 to operate the ignition plugs 3, the throttle valve 7 and the fuel injection valves 9.

In the aforementioned case, the sun gear of the drive power split mechanism 19 connected to the generator 20 rotates whereas the ring gear connected to the wheels 24, remains stopped. Therefore, substantially the entire torque of the sun gear is transmitted to the planetary carrier. When the planetary gear rotates upon receiving the torque from the sun gear, the crankshaft 100a of the engine 100 also rotates because the planetary carrier is connected to the crankshaft 100a. At that moment, the E-ECU 29 operates the ignition plugs 3, the throttle valve 7 and the fuel injection valves 9, so that the cranking of the engine 100 is accomplished and therefore the engine 100 starts.

When the cooling water temperature rises to or above a predetermined temperature after the start-up of the engine 100, the H-ECU 30 considers that the warm-up of the engine 100 is completed, and stops the operation of the engine 100 through the E-ECU 29.

When the hybrid vehicle stops while the ignition switch remains on, the H-ECU 30 controls the E-ECU 29 to stop the operation of the engine 100, and controls the inverter 26 to stop the operation of the electric motor 200.

However, during a stop of the vehicle, the engine 100 is started if the output signal of the SOC controller 28 (signal indicating the state of charge of the battery 27) is below a predetermined level, or if there occurs a need to operate an accessory, such as a compartment air-conditioner compressor or the like, which is driven by a part of the torque outputted from the engine 100, or if there occurs a need to warm up the engine 100 or the exhaust gas emission system.

For the pull-off of the hybrid vehicle, the H-ECU 30 controls the inverter 26 to apply a drive electric power from the battery 27 to the electric motor 200. When the drive electric power is supplied from the battery 27 to the electric motor 200, the motor shaft 200a of the electric motor 200 is turned and torque is transmitted from the motor shaft 200a to the wheels 24, 25 via the speed reducer 21 and the drive shafts 22, 23. The vehicle thereby pulls off.

At the time of pull-off of the vehicle, the H-ECU 30 starts the engine 100 if the state of charge of the battery 27 is not good, or if there is a need to operate an accessory such as an air-conditioner compressor or the like, or if there is a need to warm up the engine 100 or the exhaust emission system.

When the engine 100 is started to charge the battery 27, or operate an accessory or the like, or warm up the engine 100 at the time of pull-off of the hybrid vehicle, the H-ECU 30 controls the inverter 26 to apply an exciting current from the battery 27 to the generator 20 so that the generator 20 operates as an electric power generator.

In this case, the crankshaft 100a is rotated by torque outputted by the engine 100. Torque is then transmitted from the crankshaft 100a to the planetary carrier of the drive power split mechanism 19, and is distributed therefrom to the sun gear and the ring gear.

The torque distributed from the planetary gear to the sun gear is transmitted to the generator 20, which is connected to the sun gear. By converting kinetic energy transmitted from the sun gear into electric energy, the generator 20 generates electric power. The electric power generated by the generator 20 is distributed to the battery 27 and the electric motor 200 by the inverter 26.

The torque distributed from the planetary gear to the ring gear is transmitted to the motor shaft 200a connected to the ring gear. Therefore, the motor shaft 200a is turned by the torque combining torque from the electric motor 200 and torque from the ring gear. The torque of the motor shaft 200a is transmitted to the wheels 24, 25 via the speed reducer 21 and the drive shafts 22, 23.

During normal running of the vehicle, the H-ECU 30 controls the E-ECU 29 so that the torque outputted from the engine 100 becomes equal to a predetermined target torque, and also controls the inverter 26 so as to stop supply of the drive electric power from the battery 27 to the electric motor 200 and so as to apply the exciting current from the battery 27 to the generator 20.

More specifically, the H-ECU 30 calculates a drive torque demanded by a driving person (hereinafter, referred to as "demanded drive torque") from the output signal (indicating the accelerator pedal depression degree) of the accelerator position sensor 31 and an output signal (indicating the vehicle speed) of a vehicle speed sensor (not shown), and determines torques that need to be outputted by the engine 100 and the electric motor 200 (hereinafter, referred to as "demanded engine torque" and "demanded motor torque") in order to achieve the demanded drive torque.

The H-ECU 30 then transmits the demanded engine torque to the E-ECU 29 and controls the inverter 26 in accordance with the demanded motor torque. In this case, the H-ECU 30 adjusts the magnitude of exciting current applied to the generator 20 to control the rotation speed of the generator 20, thereby controlling the engine revolution speed of the engine 100.

The demanded engine torque transmitted from the H-ECU 30 to the E-ECU 29 is, for example, a value determined by using the amount of air taken into the engine 100 and the engine revolution speed as parameters. The H-ECU 30 has a map that indicates a relationship among the amount of intake air, the engine revolution speed and the engine torque. Based on the map, the H-ECU 30 specifies an amount of intake air and an engine revolution speed corresponding to the desired engine torque. Thus, the H-ECU 30 transmits the specified amount of intake air and the specified engine revolution speed, as the demanded engine torque, to the E-ECU 29.

Upon receiving the demanded engine torque from the H-ECU 30, the E-ECU 29 determines a throttle opening extent, a fuel injection amount, a fuel injection timing and an ignition timing in accordance with the demanded engine torque, and accordingly controls the throttle valve actuator 8, the fuel injection valves 9 and the ignition plugs 3.

When it becomes necessary to charge the battery 27 during normal running of the vehicle, the H-ECU 30 controls the E-ECU 29 to increase the torque output of the engine 100, and also controls the inverter 26 to increase the exciting current applied from the battery 27 to the generator 20. Thus, the H-ECU 30 increases the amount of electric power generated while securing the demanded drive torque.

When the hybrid vehicle is in an accelerating state, the H-ECU 30 calculates a demanded drive torque, a demanded engine torque and a demanded motor torque as in the above-described calculations during normal running. Then, the H-ECU 30 controls the engine 100 through the E-ECU 29, and controls the electric motor 200 through the inverter 26.

In this case, the H-ECU 30 controls the inverter 26 to apply electric power from the battery 27 to the electric motor 200 as well as electric power generated by the generator 20, thereby increasing the torque output of the electric motor 200.

When the hybrid vehicle is in a decelerating or braking state, the H-ECU 30 controls the E-ECU 29 to stop the operation of the engine 100 (stop the fuel injection control and the ignition control), and also controls the inverter 26 to stop the operation of the generator 20 and the operation of the electric motor 200.

Subsequently, the H-ECU 30 controls the inverter 26 to apply the exciting current from the battery 27 to the electric motor 200 so that the electric motor 200 operates as a generator, thereby performing regenerative power generation, that is, conversion of kinetic energy transmitted from the wheels 24, 25 to the motor shaft 200a via the drive shafts 22, 23 and the speed reducer 21 into electric energy. The electric power regeneratively generated by the electric motor 200 is charged into the battery 27 via the inverter 26.

The E-ECU 29 is connected to the upstream-side air-fuel ratio sensor 13, the downstream-side air-fuel ratio sensor 14, the crank position sensor 17, the water temperature sensor 18, the air flow meter 32, the throttle position sensor 33, and the adsorbent temperature sensor 34 of the adsorber mechanism 15 by electric wirings, so that the E-ECU 29 is able to accept inputs of output signals of those sensors and the like.

The E-ECU 29 is also connected to the ignition plugs 3, the throttle valve actuator 8, the fuel injection valves 9, and the valve device 160 (actuator 166) of the adsorber mechanism 15 by electric wirings. Based on the output signals of the various sensors and the demanded engine torque from the H-ECU 30, the E-ECU 29 performs the ignition control, the throttle control, the fuel injection control, and the control of the adsorber mechanism 15.

For example, during the fuel injection control, the E-ECU 29 determines a fuel injection amount (TAU) as in the following fuel injection amount determining arithmetic expression:

$$TAU=TP\times FWL\times(FAF+FG)\times[FASE+FAE+FOTP+FDE(D)]\times FFC+TAUV$$

where:
TP: basic injection amount
FWL: warm-up increase
FAF: air-fuel ratio feedback correction factor
FG: air-fuel ratio learned factor
FASE: post-startup increase
FAE: acceleration increase
FOTP: OTP increase
FDE(D): deceleration increase (decrease)
FFC: fuel-cut-return correction factor
TAUV: invalid injection duration For the aforementioned calculation, the E-ECU 29 determines an operation state of the engine 100 by using the values of output signals of the various sensors as parameters. Based on the determined engine operation state and a map pre-stored in a ROM or the like provided in the E-ECU 29, the E-ECU 29 calculates the basic injection amount (TP), the warm-up increase (FWL), the post-startup increase (FASE), the acceleration increase (FAE), the OTP increase (FOTP), the deceleration increase (FDE(D)), the fuel-cut-return correction factor (FFC), the invalid injection duration (TAUV), and the like.

The E-ECU 29 calculates the air-fuel ratio feedback correction factor (FAF) by the following procedure. That is, the E-ECU 29 first determines whether a condition for the air-fuel ratio feedback control is met.

Examples of the condition for the air-fuel ratio feedback control include:
  a condition that the cooling water temperature is equal to or higher than a predetermined temperature;
  a condition that the engine 100 is in a non-startup state;
  a condition that the post-startup increasing correction of the fuel injection amount is not performed;
  a condition that the warm-up increasing correction of the fuel injection amount is not performed;
  a condition that the acceleration increasing correction of the fuel injection amount is not performed;

a condition that the OTP increasing correction for preventing overheating of exhaust system component parts, such as the three-way catalyst device 12 and the like, is not performed; and a condition that the fuel cut control is not performed.

When the condition for the air-fuel ratio feedback control is not met, the E-ECU 29 sets the air-fuel ratio feedback correction factor (FAF) to "1.0" and thereby calculates a fuel injection amount (TAU).

When the condition for the air-fuel ratio feedback control is met, the E-ECU 29 receives the output signal of the upstream-side air-fuel ratio sensor 13. Based on the output signal of the upstream-side air-fuel ratio sensor 13 and the response delay time of the upstream-side air-fuel ratio sensor 13, the E-ECU 29 determines whether the actual air-fuel ratio of exhaust gas is in the lean side or the rich side of the theoretical air-fuel ratio.

If it is determined that the actual exhaust air-fuel ratio is in the rich side of the theoretical air-fuel ratio, the E-ECU 29 corrects the air-fuel ratio feedback correction factor (FAF) so as to decrease the fuel injection amount (TAU). If it is determined that the actual exhaust air-fuel ratio is in the lean side of the theoretical air-fuel ratio, the E-ECU 29 corrects the air-fuel ratio feedback correction factor (FAF) so as to increase the fuel injection amount (TAU).

The air-fuel ratio feedback correction factor (FAF) determined by the aforementioned procedure is subjected to upper and lower guard processes, and then substituted in the aforementioned fuel injection amount determining arithmetic expression in order to calculate a fuel injection amount (TAU).

In addition to the aforementioned air-fuel ratio feedback control based on the output signal of the upstream-side air-fuel ratio sensor 13 (first air-fuel ratio feedback control), the E-ECU 29 may perform another air-fuel ratio feedback control based on the output signal of the downstream-side air-fuel ratio sensor 14 (second air-fuel ratio feedback control).

In the second air-fuel ratio feedback control, the E-ECU 29, for example, compares the value of output signal of the downstream-side air-fuel ratio sensor 14 with a predetermined reference voltage to determine whether the air-fuel ratio of exhaust gas let out of the three-way catalyst device 12 is a lean air-fuel ratio or a rich air-fuel ratio. Based on the result of determination, the CPU 42 corrects the amount of correction of the air-fuel ratio feedback correction factor (FAF), the criterion value for the rich/lean determination and the like used in the first air-fuel ratio feedback control. Thereby, the E-ECU 29 curbs variations in the output characteristic of the upstream-side air-fuel ratio sensor 13 due to differences among individual sensors, deterioration of the upstream-side air-fuel ratio sensor 13 due to aging, and the like.

In the control of the adsorber mechanism 15, when the engine 100 is started, the E-ECU 29 accepts the output signal (cooling water temperature) of the water temperature sensor 21, and calculates a time required between the start of the engine 100 and activation of the three-way catalyst device 12 (hereinafter, referred to as "catalytic activation time") based on the output signal of the water temperature sensor 21 and a predetermined map.

While the elapsed time from the start of the engine 100 is less than the aforementioned catalytic activation time, that is, while the three-way catalyst device 12 is in the non-active state, the E-ECU 29 outputs a control signal to the actuator 166 to set the valve body 162 of the valve device 160 to the completely closed state (set the main exhaust passage in the adsorber mechanism 15 to the non-conducting state).

During that period, therefore, the entire amount of exhaust gas from the engine 100 flows into the three-way catalyst device 12 via the bypass passage and the adsorbent 152 within the adsorber mechanism 15. As a result, unburned fuel contained in exhaust gas is not let out into the atmosphere but is adsorbed by the adsorbent 152.

When the elapsed time from the start of the engine 100 reaches or exceeds the catalytic activation time, that is, when the three-way catalyst device 12 is activated, the E-ECU 29 outputs a control signal to the actuator 166 to set the valve body 162 of the valve device 160 to the fully open state (set the main exhaust passage in the adsorber mechanism 15 to the conducting state).

Therefore, both the main exhaust passage and the bypass passage in the adsorber mechanism 15 are now in the conducting state, so that exhaust gas from the engine 100 flows into the three-way catalyst device 12 via the main exhaust passage and the bypass passage. Thus, harmful gas components are substantially removed from exhaust gas by the three-way catalyst device 12.

In the adsorber mechanism 15 in this embodiment, the exhaust gas inlet and the exhaust gas outlet of the bypass passage are adjacent to each other. Therefore, the difference between the exhaust gas pressure near the exhaust gas inlet and the exhaust gas pressure near the exhaust gas outlet is small, and the phase difference between the pulsating flow of exhaust gas through a portion of the main exhaust passage extending near the exhaust gas inlet of the bypass passage and the pulsating flow of exhaust gas through a portion of the main exhaust passage extending near the exhaust gas outlet of the bypass passage is small. As a result, of the entire amount of exhaust gas discharged from the engine 100, only a very small portion flows into the three-way catalyst device 12 via the bypass passage, and the major portion flows into the three-way catalyst device 12 via the main exhaust passage.

When the flow through the bypass passage is very small, the flow of exhaust gas through the adsorbent 152 correspondingly becomes very small, so that the temperature increasing rate of the adsorbent 152 becomes small or gentle. Therefore, unburned fuel adsorbed by the adsorbent 152 gradually desorbs little by little therefrom.

As a result, the amount of unburned fuel introduced from the bypass passage into a portion of the exhaust pipe 11 extending upstream of the three-way catalyst device 12 becomes very small, so that the air-fuel ratio of exhaust gas flowing into the three-way catalyst device 12 will not deviate to excessively rich ratios that are out of the aforementioned catalytic emission window.

In this manner, the air-fuel ratio of exhaust gas flowing into the three-way catalyst device 12 remains within the range of the catalytic emission window, within which the three-way catalyst device 12 is able to treat or substantially remove hydrocarbons (HC), carbon monoxide (CO) and nitrogen oxide ($NO_x$). Thus, it is ensured that three-way catalyst device 12 substantially removes unburned fuel (unburned HC), carbon monoxide (CO) and nitrogen oxide ($NO_x$) from exhaust gas.

Next described will be drive power control, which is a gist of the invention. In this embodiment, the E-ECU 29 and the H-ECU 30 execute applications programs as follows.

Figure 5:
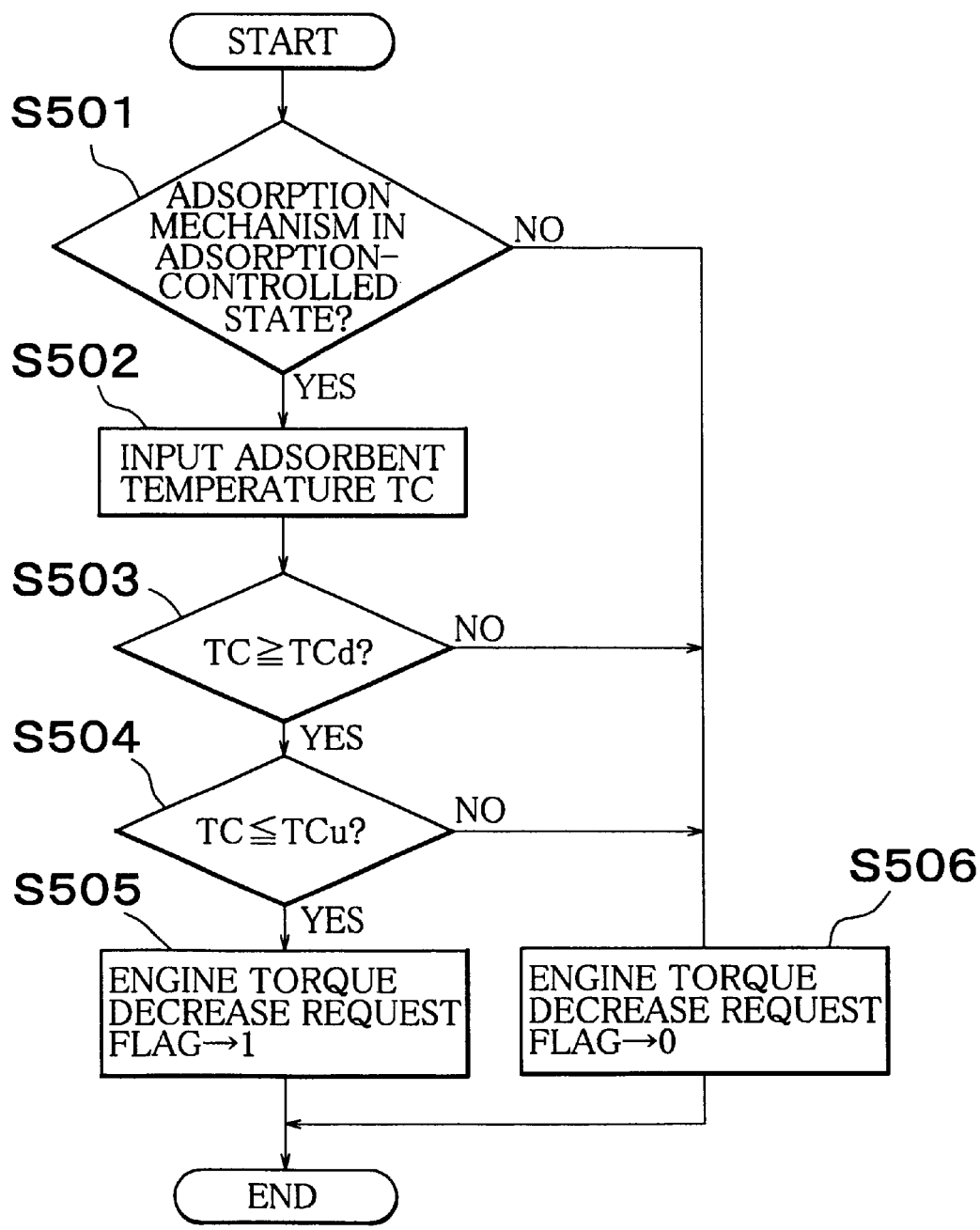
FIG. 5 is a flowchart illustrating an adsorption state determining routine.

The E-ECU 29 executes an adsorption state determining routine as illustrated in FIG. 5.

The adsorption state determining routine is an application program pre-stored in the ROM or the like of the E-ECU 29. The routine is repeatedly executed at intervals of a predetermined time (e.g., every time the crank position sensor 17 outputs a pulse signal) while the engine 100 is in operation.

In the adsorption state determining routine, the E-ECU 29 first determines in step S501 whether the valve device 160 is being controlled to the completely closed state so that unburned fuel contained in exhaust gas is adsorbed in the adsorbent 152.

If the determination in step S501 is negative (NO), the E-ECU 29 writes "0" into an engine torque decrease request flag storage area pre-set in a memory that is randomly accessible by the E-ECU 29 and the H-ECU 30. Then, the E-ECU 29 temporarily ends the routine.

If the determination in step S501 is affirmative (YES), the E-ECU 29 proceeds to step S502, in which the E-ECU 29 accepts input of the output signal TC of the adsorbent temperature sensor 34 (temperature of the adsorbent 152).

Subsequently in steps S503 and S504, the E-ECU 29 determines whether the adsorbent temperature TC inputted in step S502 is within a predetermined temperature range (TCd≦TC≦TCu).

The predetermined temperature range is a temperature range that is suitable for the adsorbent 152 to adsorb unburned fuel contained in exhaust gas. The highest value TCu and the lowest value TCd in the temperature range are experimentally determined beforehand, and pre-stored in the ROM of the E-ECU 29.

If it is determined through steps S503 and S504 that the adsorbent temperature TC is within the predetermined temperature range (YES in steps S503 and S504), the E-ECU 29 proceeds to step S505, in which the E-ECU 29 writes "1" into the aforementioned engine torque decrease request flag storage area. The E-ECU 29 then temporarily ends the routine.

If it is determined that the adsorbent temperature TC is not within the predetermined temperature range (NO in step S503 or S504), the E-ECU 29 proceeds to step S506, in which the E-ECU 29 writes "0" into the engine torque decrease request flag storage area. The E-ECU 29 then temporarily ends the routine.

Figure 6:
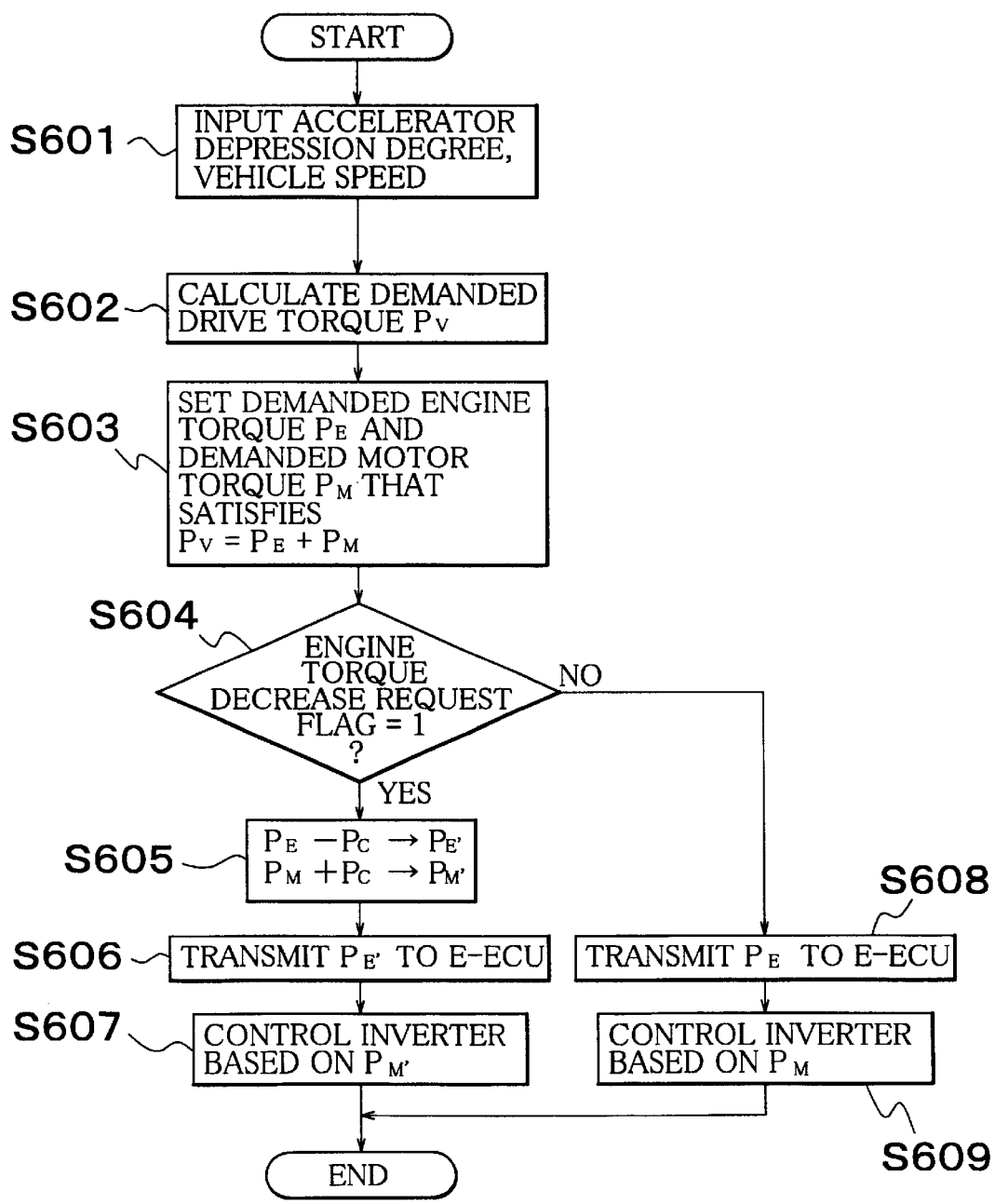
FIG. 6 is a flowchart illustrating a drive power distribution control routine.

The H-ECU 30 executes a drive power distribution control routine as illustrated in FIG. 6.

The drive power distribution control routine is an application program pre-stored in a ROM or the like of the H-ECU 30. The routine is repeatedly executed at intervals of a predetermined time while the ignition switch is on.

In the drive power distribution control routine, the H-ECU 30 accepts input of the output signal of the accelerator position sensor 31 (accelerator pedal depression degree) and the output signal of the vehicle speed sensor (not shown) in step S601.

Subsequently in step S602, the H-ECU 30 calculates a drive torque demanded by a driving person (demanded drive torque $P_v$) from the accelerator pedal depression degree and the vehicle speed inputted in step S601.

Subsequently in step S603, the H-ECU 30 determines torques that need to be outputted by the engine 100 and the electric motor 200 (hereinafter, referred to as "demanded engine torque $P_E$" and "demanded motor torque $P_M$") in order to achieve the demanded drive torque $P_v$ calculated in step S602.

Subsequently in step S604, the H-ECU 30 accesses the engine torque decrease request flag storage area of the memory accessible by the H-ECU 30 and the E-ECU 29, and determines whether "1" is stored in the engine torque decrease request flag storage area, that is, whether there is a request from the E-ECU 29 for decreasing the torque that is to be outputted by the engine 100.

If it is determined in step S604 that "1" is stored in the engine torque decrease request flag storage area (YES), the H-ECU 30 proceeds to step S605. In step S605, the H-ECU 30 calculates a new demanded engine torque $P_E'$ by subtracting a predetermined amount $P_C$ from the demanded engine torque $P_E$ calculated in step S603, and also calculates a new demanded motor torque $P_M'$ by adding the predetermined amount $P_C$ to the demanded motor torque $P_M$ calculated in step S603.

Subsequently in step S606, the H-ECU 30 controls the E-ECU 29 so that the torque actually outputted from the engine 100 becomes equal to the demanded engine torque $P_E'$ calculated in step S605.

Subsequently in step S607, the H-ECU 30 controls the inverter 26 so that the torque actually outputted from the electric motor 200 becomes equal to the demanded motor torque $P_M'$ calculated in step S605. Then, the H-ECU 30 temporarily ends the routine.

Conversely, if it is determined in step S604 that "0" is stored in the engine torque decrease request flag storage area (NO), the H-ECU 30 proceeds to step S608. In step S608, the H-ECU 30 controls the E-ECU 29 so that the torque actually outputted from the engine 100 becomes equal to the demanded engine torque $P_E$ calculated in step S603.

Subsequently in step S609, the H-ECU 30 controls the inverter 26 so that the torque actually output from the electric motor 200 becomes equal to the demanded motor torque $P_M$ calculated in step S603. Then, the H-ECU 30 temporarily ends the routine.

Thus, through the adsorption state determining routine executed by the E-ECU 29 and the drive power distribution control routine executed by the H-ECU 30, the torque that needs to be outputted by the engine 100 is decreased if the temperature of the adsorbent 152 is within the temperature range suitable for the adsorbent 152 to adsorb unburned fuel when the three-way catalyst device 12 is in the non-active state and unburned fuel contained in exhaust gas is to be adsorbed in the adsorbent 152 (for example, at the time of cold start of the engine 100). As a result, the load on the engine 100 decreases.

When the load on the engine 100 decreases, the temperature of exhaust gas discharged from the engine 100 decreases and the flow of exhaust gas discharged from the engine 100 decreases. In this case, as the temperature of exhaust gas flowing through the adsorbent 152 decreases, the flow of exhaust gas through the adsorbent 152 also decreases, so that the amount of heat transferred from exhaust gas to the adsorbent 152 decreases.

Figure 7:
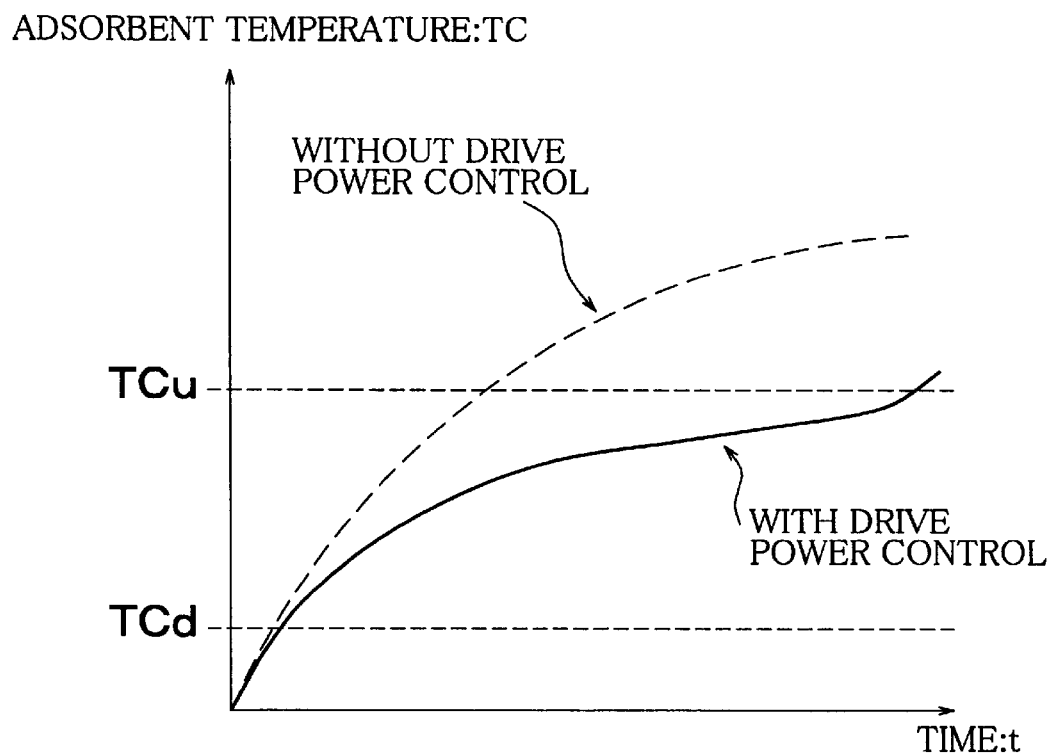
FIG. 7 is a graph indicating temperature changes of an adsorbent.

As indicated in FIG. 7, due to the drive power control, the temperature of the adsorbent 152 is maintained within a predetermined temperature range for a longer time than if the drive power control were not performed. Therefore, an increased amount of unburned fuel is adsorbed by the adsorbent 152.

Furthermore, as the temperature increase of the adsorbent 152 is delayed by the drive power control, the timing of start of desorption of unburned fuel from the adsorbent 152 is also delayed. Thus, a longer time is allowed before the desorption starts, so that the three-way catalyst device 12 is more reliably activated before the start of desorption. That is, the drive power control substantially prevents unburned fuel from being desorbed from the adsorbent 152 before the three-way catalyst device 12 is activated.

Therefore, the embodiment effectively utilizes the adsorbing capability of the adsorbent 152, and prevents degradation of emission quality that would otherwise be caused by unburned fuel being desorbed from the adsorbent 152 before activation of the three-way catalyst device 12.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. An exhaust gas emission control apparatus for a hybrid vehicle wherein the vehicle is driven by an internal combustion engine and an electric motor, the apparatus comprising:

an adsorbent provided in an exhaust passage of the engine wherein, when an adsorbent temperature is lower than a predetermined temperature, the adsorbent adsorbs therein unburned fuel contained in exhaust gas and, when the adsorbent temperature is at least the predetermined temperature, the adsorbent releases the unburned fuel therefrom; and a controller which, when the temperature of the adsorbent is below the predetermined temperature, decreases a drive power output from the engine and increases a drive power output from the electric motor, so that an increase in the temperature of the adsorbent is delayed.

2. An exhaust gas emission control apparatus according to claim 1, further comprising an exhaust gas emission catalyst provided in the exhaust passage downstream of the adsorbent, the exhaust gas emission catalyst substantially removing the unburned fuel from exhaust gas.

3. An exhaust gas emission control apparatus for a hybrid vehicle wherein the vehicle is driven by an internal combustion engine and an electric motor, the apparatus comprising:

an adsorbent provided in an exhaust passage of the engine wherein, when an adsorbent temperature is lower than a predetermined temperature, the adsorbent adsorbs therein unburned fuel contained in exhaust gas and, when the adsorbent temperature is at least the predetermined temperature, the adsorbent releases the unburned fuel therefrom; and a controller which, when the temperature of the adsorbent is below the predetermined temperature, controls a drive power output from the engine and a drive power output from the electric motor to delay an increase in the temperature of the adsorbent.

4. The exhaust gas emission control apparatus according to claim 3, wherein the controller controls a torque of the engine as the drive power output from the engine.

5. The exhaust gas emission control apparatus according to claim 4, wherein the controller decreases the torque of the engine.

6. An exhaust gas emission control apparatus for a hybrid vehicle wherein the vehicle is driven by an internal combustion engine and an electric motor, the apparatus comprising:

an adsorbent provided in an exhaust passage of the engine wherein, when an adsorbent temperature is lower than a predetermined temperature, the adsorbent adsorbs therein unburned fuel contained in exhaust gas and, when the adsorbent temperature is at least the predetermined temperature, the adsorbent releases the unburned fuel therefrom; and a controller which, when the temperature of the adsorbent is below the predetermined temperature, controls a drive power output from the engine to delay an increase in the temperature of the adsorbent.

7. The exhaust gas emission control apparatus according to claim 6, wherein the controller controls a torque of the engine as the drive power output of the engine.

8. The exhaust gas emission control apparatus according to claim 7, wherein the controller decreases the torque of the engine.

* * * * *